US011962355B2

(12) United States Patent
Shrivastava

(10) Patent No.: US 11,962,355 B2
(45) Date of Patent: Apr. 16, 2024

(54) SIGNAL PROCESSING DEVICE WITH LIPID INTERFACE

(71) Applicant: Oxford University Innovation Limited, Oxford (GB)

(72) Inventor: Shamit Shrivastava, Oxford (GB)

(73) Assignee: APOHA LIMITED, London (GB)

( * ) Notice: Subject to any disclaimer, the term of this patent is extended or adjusted under 35 U.S.C. 154(b) by 43 days.

(21) Appl. No.: 15/734,408

(22) PCT Filed: Jun. 6, 2019

(86) PCT No.: PCT/GB2019/051577
§ 371 (c)(1),
(2) Date: Dec. 2, 2020

(87) PCT Pub. No.: WO2019/234437
PCT Pub. Date: Dec. 12, 2019

(65) Prior Publication Data
US 2021/0167868 A1    Jun. 3, 2021

(30) Foreign Application Priority Data

Jun. 6, 2018   (GB) .................................... 1809304

(51) Int. Cl.
*H04B 13/00* (2006.01)
*H04B 11/00* (2006.01)

(52) U.S. Cl.
CPC ............. *H04B 13/00* (2013.01); *H04B 11/00* (2013.01)

(58) Field of Classification Search
CPC ..... H04B 11/00; H04B 13/00; H01L 51/0093;
B01J 2219/00734; H04R 3/00; H04R 17/00; G01N 33/92; G01N 27/07; G01N 27/30; G01N 436/149; G01N 436/151
See application file for complete search history.

(56) References Cited

U.S. PATENT DOCUMENTS

| 3,970,804 A | * | 7/1976 | O'Brien ................. | H04R 21/00 381/120 |
| 6,999,953 B2 | | 2/2006 | Ovhsinsky | |
| 2014/0211593 A1 | * | 7/2014 | Tyler ..................... | H04B 11/00 367/137 |

OTHER PUBLICATIONS

Griesbauer, J. et al., "Wave Propagation in Lipid Monolayers", Biophysical Journal, vol. 97, No. 10, pp. 2710-2716, 2009 (Year: 2009).*

(Continued)

*Primary Examiner* — Isam A Alsomiri
*Assistant Examiner* — Joseph C Fritchman
(74) *Attorney, Agent, or Firm* — Thomas|Horstemeyer, LLP

(57) ABSTRACT

A signal processing device (1) includes a first medium (2), a second medium (3) and a lipid interface (4) arranged between the first medium and the second medium. The lipid interface includes multiple lipid molecules (5). An input transducer (8) is arranged to apply an input signal to the lipid interface to generate a mechanical pulse in the lipid interface. An output transducer (9) is arranged to receive an output signal by detecting a mechanical response (14) in the lipid interface from the mechanical pulse generated in the lipid interface by the input transducer.

19 Claims, 3 Drawing Sheets

(56) References Cited

OTHER PUBLICATIONS

Shrivastava, S. and Schneider, M. F., (2014), "Evidence for two-dimensional solitary sound waves in a lipid controlled interface and its implications for biological signaling", Journal of the Royal Society Interface, vol. 11: 20140098 (Year: 2014).*
Zhu J, Emanetoglu NW, Lu Y, Kosinski JA, Pastore RA Jr. A multi-IDT input tunable surface acoustic wave filter. IEEE Trans Ultrason Ferroelectr Freq Control. Sep. 2001; 48(5):1383-8 (Year: 2001).*
Griesbauer, J. et al., 2012, "Simultaneously propagating voltage and pressure pulses in lipid monolayers of pork brain and synthetic lipids", Physical Review E 86, 061909 (Year: 2012).*
Kappler et al., 2017, "Nonlinear fractional waves at elastic interfaces", Physical Review Fluids 2, 114804 (Year: 2017).*
Heimburg and Jackson, 2007, "On the action potential as a propagating density pulse and the role of anesthetics", Biophysical Reviews and Letters, 2(1), 57-78 (Year: 2007).*
Griesbauer et al., 2012, "Propagation of 2D Pressure Pulses in Lipid Monolayers and Its Possible Implications for Biology" PRL 108, 198103 (Year: 2012).*
Lee et al., 1994, "Electric Field-Induced Concentration Gradients in Lipid Monolayers" Science, 263 (Year: 1994).*
Fichtl et al., 2016, "Predicting specific biological signaling from physics", Nature Scientific Reports, 6, 22874 (Year: 2016).*
Shrivastava and Schneider, 2013, "Opto-Mechanical Coupling in interfaces under static and propagative conditions and its biological implications", PLOS One 8 (7) (Year: 2013).*
International Search Report & Written Opinion for WO2019/234437 (PCT/GB2019/051577), dated Aug. 28, 2019, pp. 1-32.
UK Search Report for GB1809304.7, dated Oct. 26, 2018, pp. 1-5.
Heimburg et al., "On soliton propagation in biomembranes and nerves. Proc Natl Acad Sci U S A 102(28)", 2005.
Chakradhar et al., "Stable superhydrophobic coatings using PVDF-MWCNT nanocomposite" Applied Surface Science, vol. 301, 2014.
Kaufmann K, "Action Potentials and Electrochemical Coupling in the Macroscopic Chiral Phospholipid Membrane" (Caruaru, Brasil). 1st Ed., 1989.
Hewitt, J, "Solitary acoustic waves observed to propagate at a lipid membrane interface", Phys.org, Jun. 20, 2014. Downloaded from https ://phys.org/news/2014-06-solitary-acoustic-propagatelipidmembrane. html on Oct. 23, 2018.
Griesbauer, J et al., "Wave Propagation in Lipid Monolayers", Biophysical Journal, vol. 97, No. 10, pp. 2710-2716, Nov. 18, 2009.
Shrivastava S and Schneider M F, "Evidence for two-dimensional solitary sound waves in a lipid controlled interface and its implications for biological signalling", Journal of the Royal Society Interface, vol. 11, No. 97, 20140098, Aug. 6, 2014.
Cincotti, S et al., "Molecular microsystem for molecular processing of information", Proc of the 2nd Italian Conference on Sensors and Microsystems, pp. 104-108, Feb. 3-5, 1997, Rome.
Shrivastava et al., "Solitary shock waves and adiabatic phase transition in lipid interfaces and nerves", Physical Review E 91, 2015.
Thuren et al., "Triggering of the activity of phospholipase A2 by an electric field", Biochemistry 1987, 26.
Steinbock et al., "Chemical Wave Logic Gates", J.Phys. Chem 1996, 100, 49.
Schneider et al., "Realization of spin-wave logic gates", Appl. Phys. Lett. 92, 022505, 2008.
Zhang et al., "Acoustic logic gates and Boolean operation based on self-collimating acoustic beams", Appl. Phys. Lett. 106, 113503, 2015.
Li et al., "Granular acoustic switches and logic elements", Nature Communications vol. 5, 5311, 2014.
Shrivastava, "Non-linear Solitary Sound Waves in Lipid Membranes and Their Possible Role in Biological Signaling" Boston, Massachussets, USA: Thesis and Disertation Collection 3917, 2014.

* cited by examiner

SIGNAL PROCESSING DEVICE WITH LIPID INTERFACE

CROSS-REFERENCE TO RELATED APPLICATIONS

This application is the National Stage of International Application No. PCT/GB2019/051577, filed Jun. 6, 2019, which claims priority to GB 1809304.7, filed Jun. 6, 2018, which are entirely incorporated herein by reference.

This invention relates to a signal processing device, in particular to a signal processing device that uses a lipid interface to propagate signals.

Computing systems are conventionally implemented in electrical circuitry, e.g. using semiconductor microprocessors. Such integrated circuits are not particularly energy efficient owing to the energy that is dissipated during operation, e.g. through dynamic and static power consumption. The resultant heating causes problems in these computing systems, particularly when a computing system is scaled, e.g. for exascale computing systems.

Conventional semiconductor based circuitry is also reaching its theoretical and physical limit in terms of the size of transistors able to be built, e.g. owing to quantum uncertainties. Thus fundamental new approaches in computing are required in order to address these problems, e.g. to satisfy the requirements for large scale computing systems from big data and artificial intelligence.

The present invention aims to provide an improved signal processing device that does not suffer from the power dissipation problems of conventional electronic circuits.

When viewed from a first aspect the invention provides a signal processing device comprising:
  a first medium;
  a second medium;
  a lipid interface arranged between the first medium and the second medium, wherein the lipid interface comprises a plurality of lipid molecules;
  an input transducer arranged to apply an input signal to the lipid interface, wherein the input signal is arranged to generate a mechanical pulse in the lipid interface; and
  an output transducer arranged to receive an output signal by detecting a mechanical response in the lipid interface from the mechanical pulse generated in the lipid interface by the input transducer;
  wherein the lipid interface is arranged to propagate the mechanical pulse from the input transducer via the lipid interface to the output transducer.

The present invention relates to a signal processing device in which signals are propagated from an input transducer to an output transducer via (along or over) a lipid interface as mechanical pulses (e.g. displacements of the lipid molecules in the lipid interface). It will be appreciated that by using a lipid interface as the medium for propagating the signals, the signals are propagated substantially adiabatically as sound waves. This is a substantially reversible phenomenon that substantially does not generate any heat and so substantially does not dissipate any energy. This is in contrast to conventional electronic integrated circuits that dissipate relatively large amounts of energy when processing data signals owing to the use of current flow in transistors and resistors, for example.

The first medium and the second medium may comprise any two suitable and desired media between which the lipid interface may be formed. The lipid interface may be supported by a solid or a gel. However, in a preferred embodiment the first medium comprises a fluid and the second medium comprises a fluid. Preferably the first medium comprises a liquid medium (e.g. water) and the second medium comprises a gaseous medium (e.g. air). Preferably the first medium and/or the second medium is viscoelastic.

The lipid interface may be arranged in any suitable and desired way between the first medium and the second medium, e.g. at the boundary between the first medium and the second medium. Preferably the lipid interface is arranged substantially horizontally. Preferably the lipid interface is substantially planar. Thus preferably the signal processing device comprises a horizontal boundary between the first medium and the second medium.

However, it will be appreciated that in some embodiments the lipid interface may be non-planar such that the propagating mechanical pulses (sound waves) bend as they pass over the lipid interface. The lipid interface may, for example, be arranged as a waveguide (e.g. similar to an optical fibre) along which the mechanical pulses propagate.

The lipid interface may comprise a bi-layer of lipid molecules or a multi-laminar layer of lipid molecules. However, in a preferred embodiment the lipid interface comprises a monolayer of lipid molecules. Preferably the lipid interface comprises a (e.g. single molecule) thin film of the lipid molecules. Preferably the lipid interface is compressible. Preferably the film of the lipid interface comprises a piezo-electric film.

Preferably the lipid interface formed by the lipid molecules is elastic, i.e. the lipid interface responds elastically to the mechanical pulse generated by the input transducer. Preferably the lipid interface exhibits non-linear behaviour, e.g. a non-linear response to the mechanical pulse generated by the input transducer.

Thus, in a particularly preferred embodiment the lipid interface comprises a non-linear compressible piezo-electric film.

Preferably the lipid molecules are arranged to undergo a phase transition when they are excited, i.e. by the input signal applied to the lipid interface by the input transducer, such that they generate the mechanical pulse. Preferably the phase transition is such that the lipid molecules are arranged to go stiff under excitation, e.g. owing to a change in the order of the lipid chains of the lipid molecules. Preferably the lipid molecules transition from an expanded (e.g. fluid) state to a condensed (e.g. gel) state (e.g. a liquid expanded to liquid condensed transition) when they are excited by the input signal applied to the lipid interface by the input transducer.

Preferably the lipid interface is arranged to exhibit a threshold behaviour (e.g. associated with a phase transition) when the input signal is applied to the lipid interface by the input transducer, which preferably results in the generation of the mechanical pulse. Thus preferably the non-linear change in the properties of the lipid interface (e.g. from a fluid to a gel, as outlined above), manifests itself as a threshold. In other words, preferably the threshold behaviour results from a non-linear response of the lipid interface to the input signal applied by the input transducer, e.g. owing to a phase transition. Providing a lipid interface with a (e.g. non-linear) threshold behaviour helps to provide an "all or none" (e.g. digital) response from the lipid interface to the input signal applied to the lipid interface by the input transducer. Such a response is useful for the propagation of (e.g. digital) signals between the input and output transducers and also for the combining (e.g. annihilation) of multiple pulses, which will be appreciated to be of use for signal processing.

Thus, preferably the input transducer is arranged to apply the input signal to the lipid interface such that the input signal applied to the lipid interface is sufficient to reach the threshold of the lipid interface, e.g. to induce a phase transition in the lipid interface. Thus preferably the amplitude of the input signal applied by the input transducer is set to a high enough amplitude to cause the lipid interface to reach its threshold. Preferably the lipid interface is arranged to be close to the phase transition. It will be appreciated that when the lipid molecules in the lipid interface are at close to their phase transition, this helps to reduce the threshold for their excitation across the phase transition, e.g. to stimulate the propagation of the mechanical pulse along the lipid interface, and thus helps to improve the sensitivity of the device.

In at least preferred embodiments, the non-linear, phase transition behaviour of the lipid at close to threshold acts to convert (and amplify) an input signal into a mechanical pulse which propagates successfully along the lipid interface. Otherwise, for example, when an input signal is applied to the lipid interface having an insufficient amplitude to reach the threshold, the input signal is not sufficient to trigger a phase transition in the lipid molecules and so the input signal is unlikely to be converted into a meaningful, propagating mechanical pulse.

The lipid interface is preferably arranged such that the mechanical pulse generated in the lipid interface by the input transducer propagates via the lipid interface as a sound wave. Propagating signals using sound waves (e.g. compared to electrical signals) is a substantially reversible and adiabatic phenomenon, resulting in substantially no heat being dissipated by the propagation of the mechanical pulse via the lipid interface. Wave propagation in lipid monolayers is discussed in Griesbauer et al, "Wave Propagation in Lipid Monolayers", Biophysical Journal, Volume 97, November 2009, 2710-2716.

Preferably the lipid interface is arranged such that the mechanical pulse (e.g. a sound wave) propagates as a result of the (e.g. non-linear) interaction of the mechanical pulse with the lipid interface. Preferably the mechanical pulse propagates in the plane of the lipid interface.

The lipid interface is preferably arranged such that the mechanical pulse generated in the lipid interface by the input transducer does not disperse as it propagates via the lipid interface. Preferably the lipid interface is arranged such that the mechanical pulse generated in the lipid interface by the input transducer propagates as a solitary wave. The mechanical pulse propagating in this way helps to conserve the information in the input signal applied to the lipid interface by the input transducer.

Preferably the lipid interface is arranged to store the input signal applied to the lipid interface by the input transducer as a capacitive charge, which propagates as the mechanical pulse. It is this capacitive charge that is detected (read) by the output transducer. As discussed below, e.g. with reference to an amplifying transducer, the output transducer may detect the mechanical pulse by measuring an output voltage or by measuring an output current.

Preferably the energy of the mechanical pulse (and thus of the capacitive charge) is substantially conserved as the mechanical pulse propagates via the lipid interface. This contrasts with semi-conductor logic processing that is performed using devices having irreversible current flows through components, which results directly in heat dissipation and energy loss.

The lipid molecules may be any suitable and desired type of lipids. Preferably the lipid molecules comprise lyotropic liquid crystals. Preferably the lipid molecules comprise chains of carbon atoms. In a particularly preferred embodiment, the lipid molecules comprise phospholipid molecules (i.e. comprising a phosphocholine head group and two (e.g. long) carbon chains). Such lipids (among others) go stiff when excited and so are particularly suited for the propagation of mechanical pulses via the interface.

Examples of suitable lipids include, among others, phosphocholine lipids (e.g. 16-carbon phosphocholine lipids and 15-carbon phosphocholine lipids) and (e.g. charged 14-carbon) phosphatidic acid lipids. The lipid interface may comprise only a single type of lipid molecules. However, in some embodiments, the lipid interface comprises a plurality of different types of lipid molecules.

As well as the type of lipid molecules used in the lipid interface, the properties of the lipid interface may be controlled by one or more (e.g. all) of the concentration of the lipid molecules in the lipid interface, the temperature of the lipid interface, and the pH or the ion concentration in the first and/or second medium. The temperature of the lipid interface may, for example, be controlled by the temperature of the first medium and/or the temperature of the second medium. Thus the first medium and/or the second medium may be heated or cooled, as is appropriate.

Preferably one or more (e.g. all) of the concentration of the lipid molecules in the lipid interface, the temperature of the lipid interface, and the pH or the ion concentration in first and/or second medium are controlled (e.g. set) so that the lipid molecules in the lipid interface are close to the phase transition. It will be appreciated that the values of these variables may be different for different types of lipid molecules. For example, if the signal processing device is desired to operate at room temperature and neutral pH, the type of lipid molecules may be chosen and their density in the lipid interface controlled to set the level of the threshold necessary to induce a propagating mechanical pulse in the lipid interface.

The input transducer may comprise any suitable and desired transducer that is able to apply an input signal to the lipid such that a mechanical pulse is generated. Preferably the input transducer is arranged to excite the lipid molecules in the lipid interface in order to generate the mechanical pulse, and may do this in any suitable and desired way. Thus the input signal may comprise an electrical signal or a mechanical signal, for example.

Preferably the input transducer is driven (e.g. actuated) by an electrical input signal. This makes it easier to integrate the signal processing device into a larger (signal processing) system and may also allow a relay to be used with the input transducer. The input transducer could be purely electrical (e.g. simply an electrode) or it could be opto-mechanical (e.g. a mechanical wave excited by an optical signal) or chemo-mechanical (e.g. a mechanical wave excited by a chemical signal). However, in a preferred embodiment the input transducer comprises an electro-mechanical transducer (e.g. a mechanical wave excited by an electrical signal).

In a preferred embodiment the input transducer comprises an electrode arranged in electrically conducting contact with the lipid interface (e.g. with the hydrophobic tails of some of the lipid molecules in the lipid interface). The input transducer is arranged to apply an input signal (e.g. a voltage pulse) to the lipid interface via the electrode to generate a mechanical pulse in the lipid interface. Thus preferably the input signal the input transducer applies to the lipid interface via the electrode is arranged to excite the lipid interface such that a mechanical pulse is generated in and propagated via the lipid interface.

Using an electrode to apply a constant voltage may change the surface pressure in the lipid film, as discussed in Thuren et al, "Triggering of the activity of phospholipase A2 by an electric field", Biochemistry, 1987, 26(16), 4907-4910.

The electrode of the input transducer may comprise any suitable and desired electrode for applying an input signal to the lipid interface. In one embodiment the electrode comprises a semiconductor electrode. The semiconductor may comprise any suitable and desired type of semiconductor, e.g. indium tin oxide or alkylated n-type silicon.

Preferably the electrode comprises a hydrophobic coating, which is arranged to be in contact with the lipid interface. The coating may comprise any suitable hydrophobic coating, e.g. a hydrophobic conductive coating such as hydrocarbon chains or polymer chains, or a hydrophobic non-conductive coating. In a preferred embodiment the coating comprises multi-walled carbon nanotubes mixed with polyvinyldene (di)fluoride. Preferably the hydrophobic conductive coating is sprayed or spin coated onto the electrode.

The (e.g. electrode of the) input transducer may comprise any suitable and desired size. In one embodiment the (e.g. electrode of the) input transducer is between 20 mm by 20 mm by 0.5 mm and 30 mm by 30 mm by 2 mm, e.g. approximately 25 mm by 25 mm by 1.1 mm.

The input transducer may be arranged to apply an input (voltage) pulse having any suitable and desired amplitude, e.g. to generate the mechanical pulse in the lipid interface. The amplitude of the input pulse may (and preferably does) depend on the nature and type of the lipid interface, e.g. as outlined above, and, e.g., the amplitude of the input pulse required to reach the threshold of the phase transition in the lipid interface. In one embodiment the input transducer is arranged to apply an input voltage pulse having an amplitude of between 50 mV and 100 V, e.g. depending on the threshold of the lipid molecules in the lipid interface.

The output transducer may comprise any suitable and desired transducer that is able to receive an output signal, by detecting a mechanical response in the lipid interface from the mechanical pulse generated in the lipid interface by the input transducer. Thus the output transducer is arranged to detect (e.g. measure) the mechanical response of the lipid interface at the location of the output transducer, owing to the mechanical pulse generated by the input transducer in the lipid interface.

The output transducer may comprise the same type of transducer as the input transducer or the output transducer may comprise a different type of transducer from the input transducer. As will be appreciated, one or more of all of the optional and preferred features outlined above with respect to the input transducer may apply equally to the output transducer.

Thus in a preferred embodiment the output transducer comprises an electromechanical transducer arranged to convert the detected mechanical response in the lipid interface into an electrical (voltage or current) signal. Thus preferably the output transducer is arranged to generate (and measure) an output (voltage) signal, which appears as a result of reversible charging of the capacitive charge stored in the lipid interface (which propagates as the mechanical pulse). Alternatively, the output transducer may be arranged to generate (and measure) an output current, e.g. if the output transducer has a bias voltage applied thereto.

In a preferred embodiment the signal processing device comprises an amplifying transducer arranged between the input transducer and the output transducer, wherein the amplifying transducer is arranged to detect a mechanical response in the lipid interface from the mechanical pulse generated in the lipid interface by the input transducer and to amplify the detected mechanical response to propagate an amplified mechanical pulse via the lipid interface to the output transducer.

Thus the amplifying transducer may act as both an input and output transducer. The amplifier operates owing to current flow across the lipid interface (e.g. owing to breaking or leakage of the dielectric lipid interface). In a preferred embodiment, the input transducer (e.g. the amplifying transducer acting with the input transducer) is arranged (from the mechanical pulse generated) to induce a current flow through the lipid interface to excite sound waves in the lipid interface.

It will be appreciated that the amplifying transducer (e.g. when a bias voltage is applied thereto) may also be used as an output transducer, e.g. by measuring an output current owing to dielectric breakdown of the lipid interface when the propagating mechanical pulse is incident upon the amplifying transducer. Preferably the amplifying transducer comprises a relay. Preferably a voltage input is connected to the amplifying transducer, wherein the voltage input is arranged to apply a bias voltage to the amplifying transducer, e.g. when the amplifying transducer detects a mechanical response in the lipid interface, in order to amplify the mechanical pulse in the lipid interface.

The amplifying transducer may comprise the same type of transducer as the input and/or output transducers, or the amplifying transducer may comprise a different type of transducer from the input and/or output transducers. As will be appreciated, one or more of all of the optional and preferred features outlined above with respect to the input transducer may apply equally to the amplifying transducer.

Thus in a preferred embodiment the amplifying transducer comprises an electromechanical transducer arranged to convert the detected mechanical response in the lipid interface into an electrical (voltage) signal, which the amplifying transducer is then arranged to use to re-excite the lipid interface to amplify the mechanical pulse propagating via the lipid interface.

In one embodiment the amplifying transducer may be arranged to convert the detected mechanical response in the lipid interface into an electrical (current) signal. Thus, preferably the bias voltage applied to the amplifying transducer is arranged to generate an output current in the amplifying transducer when the mechanical pulse propagating along the lipid interface is incident upon the amplifying transducer.

Owing to the bias voltage applied to the amplifying transducer, a sudden increase in the bias current will be seen at the amplifying transducer when the mechanical pulse is incident upon the amplifying transducer. This is because the conductivity of the lipid interface increases non-linearly during the propagation of a sound wave (similar to dielectric breaking) such that a region of coexisting phases just behind the mechanical pulse has a much higher conductivity than either the fluid or gel phase of the lipid interface.

This increase in the bias current neutralises the bias voltage suddenly and thus amplifies the mechanical pulse propagating in the lipid interface. The bias current has two components: the capacitive component is the same as for the input and output transducers but there is also a resistive component which does work on the lipid interface, allowing it to amplify the mechanical pulse. This does not need any external control which is synchronised with the incidence of the mechanical pulse on the amplifying relay and thus can operate continuously.

The bias voltage determines the position of the lipid interface's state (e.g. "base" voltage) with respect to the threshold voltage. Thus by lowering or increasing the bias voltage the amplifying transducer can be arranged to be more or less excitable. The bias voltage thus represents a memory, which is local (i.e. available at the point of operation), but may be controlled by an external circuit via the amplifying transducer. This control over the sensitivity of an amplifying transducer may be useful when connecting a plurality of the signal processing devices together in a network (as will be discussed below), e.g. to perform learning based tasks.

The signal processing device may comprise any suitable and desired number of input transducers, any suitable and desired number of output transducers, and any suitable and desired number of amplifying transducers. In one embodiment the signal processing device comprises a plurality of input transducers and/or a plurality of output transducers and/or a plurality of amplifying transducers.

Preferably each of the plurality of input transducers are arranged to apply an (e.g. independent) input signal to the lipid interface, wherein the input signal is arranged to generate a mechanical pulse in the lipid interface. Preferably each of the plurality of output transducers are arranged to receive an output signal by detecting a mechanical response in the interface from the mechanical pulse(s) generated in the lipid interface by the input transducer(s). Preferably each of the plurality of amplifying transducers are arranged to detect a mechanical response in the lipid interface from the mechanical pulse(s) generated in the lipid interface by the input transducer(s) and to amplify the detected mechanical response(s) to propagate one or more amplified mechanical pulses via the lipid interface to the output transducer(s).

It will be appreciated that when the signal processing device comprises a plurality of input transducers the plurality of mechanical pulses generated in the lipid interface may (and preferably do) interact (e.g. interfere) with each other as they propagate via the lipid interface. The Applicant has appreciated that two colliding mechanical pulses may be arranged to interfere constructively, interfere destructively or interact non-linearly (where the resulting amplitude is not equal to the linear sum of interacting sound waves, e.g. annihilate each other). These properties, which preferably result from the phase transition behaviour of the lipid interface, may be exploited usefully for logic processing using the signal processing device.

Therefore, depending on the relative positioning of the plurality of input transducers and the relative positioning of the one or more output transducers, the one or more output transducers are (e.g. each) arranged to detect the mechanical response in the lipid interface from the resultant mechanical pulse(s) received at the one or more output transducers. In a preferred embodiment, the signal processing device comprises a plurality of input transducers each arranged to apply an input signal to the lipid interface, wherein the input signal is arranged to generate a mechanical pulse in the lipid interface, and wherein the output transducer is arranged to receive the resultant interaction of the plurality of mechanical pulses generated by the plurality of input transducers respectively as the output signal Thus it will be appreciated that the signal processing device may be arranged to act an artificial neuron (e.g. a perceptron) or as a logic gate. In one embodiment the signal processing device is arranged as a linear classifier (e.g. OR or AND logic gate), i.e. comprising two input transducers and one output transducer.

Preferably the two input transducers and the output transducer are positioned relative to each other such that the two mechanical pulses generated by the input transducers are arranged to interact with each other to produce a combined mechanical response, which is detected by the output transducer.

In one embodiment the signal processing device comprises one or more channels (e.g. waveguides) arranged to direct the mechanical pulse generated by the input transducer to the output transducer or to an amplifying transducer. This may help to increase the distance a mechanical pulse is able to propagate via the lipid interface. When the signal processing device comprises a plurality of input transducers and/or a plurality of output transducers and/or a plurality of amplifying transducers, the signal processing device may comprise a plurality of channels arranged between the one or more input transducers and the one or more output transducers.

When the signal processing device comprises a plurality of input transducers, preferably the channels are arranged to direct the mechanical pulses generated by the plurality of input transducers such that they interact with each other before propagating towards to the one or more output transducers. It will be appreciated that this arrangement may be particularly useful when the signal processing device is arranged to act as an artificial neuron or as a logic gate.

The signal processing device may form part of a larger signal processing system. Thus the present invention also provides a signal processing system comprising a signal processing device according to any one of the embodiments of the present invention. Preferably the signal processing system comprises a plurality of signal processing devices. Preferably the plurality of signal processing devices are connected together, e.g. via their respective input and output transducers.

It will be appreciated that the signal processing device may have other applications simply than propagating signals between the input transducer and the output transducer. In one embodiment the device may be used as a (e.g. (bio) molecular or physical) sensor. As has been outlined above, the behaviour (e.g. the phase transition) of the lipid interface may be dependent upon one or more of its properties. Furthermore, the lipid interface is held between the first medium and the second medium, from which other molecules may enter the lipid interface, for example. Such molecules may affect the properties of the lipid interface.

Owing, in at least preferred embodiments, to the operation of the device being sensitive to the phase transition of the lipid interface, small (e.g. trace) amounts of molecules entering the lipid interface may affect the properties of the lipid interface and thus the operation of the device. This may allow the lipid interface to operate as a sensor.

Thus, in one embodiment, the presence of (e.g. analyte) molecules to be detected in the lipid interface, which modify the properties of the lipid interface (and, e.g. its threshold for the phase transition), may be detected by propagating a mechanical pulse from the input transducer over the lipid interface and observing the response of the lipid interface at the output transducer. For example, the presence of (e.g. analyte) molecules to be detected in the lipid interface may result in a mechanical pulse which would otherwise be received at and detected by the output transducer not be detected, or vice versa, indicating the presence of the (e.g. analyte) molecules in the lipid interface.

The device may be arranged to detect the presence of any suitable and desired (e.g. analyte) molecules, such as organic antibodies, peptides, proteins or inorganic molecules (cations or anions).

The lipid interface may comprise lipid conjugated receptor molecules, such that it can be made sensitive to certain molecules (e.g. a particular antibody), or may comprise photo-isomers (e.g. so that it could operate as a photosensor).

Various embodiments of the present invention will now be described by way of example only and with reference to the accompanying drawings, in which.

Embodiments of the present invention will now be described in the context of the digital signal processing using sound waves to propagate signals.

Figure 1:
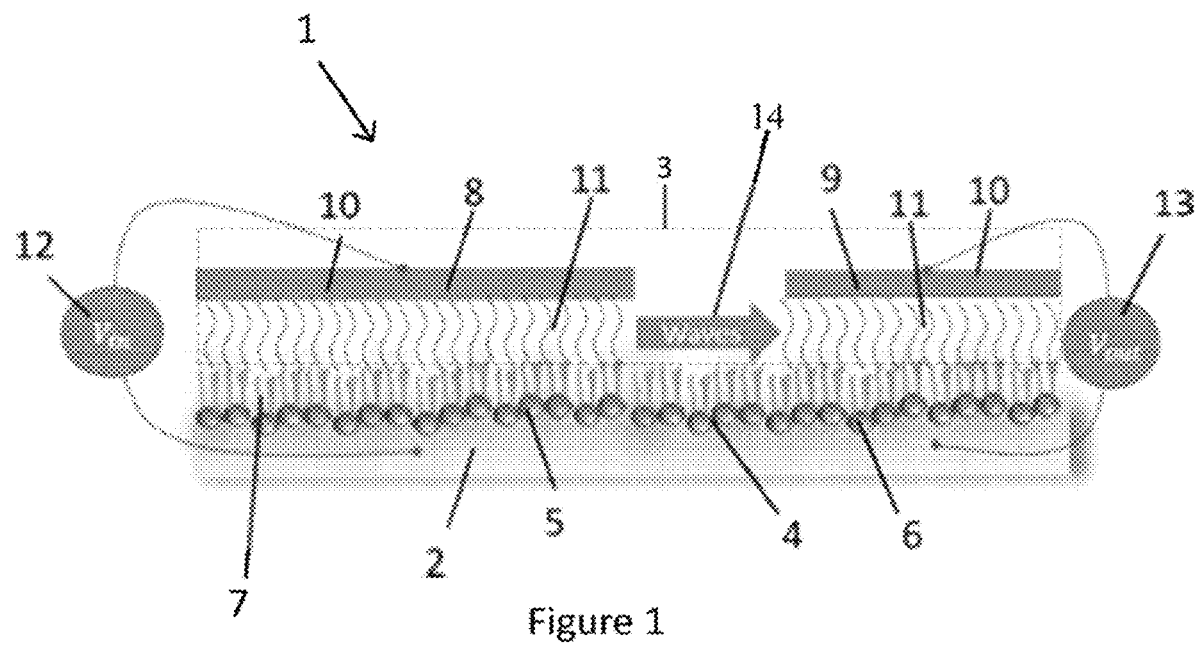
FIG. 1 shows schematically a signal processing device in accordance with an embodiment of the present invention.

FIG. 1 shows schematically a signal processing device 1 in accordance with an embodiment of the present invention. The device 1 comprises a volume of water 2 arranged below a volume of air 3, e.g. in a Langmuir trough. A lipid monolayer 4 is arranged on the surface of the water 2, i.e. at the boundary between the water 2 and the air 3. Thus FIG. 1 shows a cross-sectional side view of the signal processing device 1 through the lipid monolayer 4.

The lipid monolayer 4 comprises a plurality of phospholipid molecules 5. The phospholipid molecules 5 each have a hydrophilic head 6 and two long hydrophobic carbon chain tails 7. Thus the phospholipid molecules 5 arrange themselves with their heads 6 in contact with the surface of the water 2 and their tails 7 projecting upwards into the air 3.

The device 1 also comprises an input electrode 8 and an output electrode 9. Each of the input and output electrodes 8, 9 comprises an indium tin oxide semiconductor substrate 10 which is coated with multi-walled carbon nanotubes 11 mixed with polyvinyldene (di)fluoride. This provides a hydrophobic conductive coating 11, which is arranged to be in contact with the lipid monolayer 4, thus electrically connecting the input and output electrodes 8, 9 to the lipid monolayer 4.

A voltage input 12 is electrically connected to the input electrode 8 and a voltage output 13 is electrically connected to the output electrode 9. The voltage input 12 is arranged to apply an input voltage signal pulse to the input electrode 8. The voltage output 13 is arranged to receive and measure an output voltage signal pulse from the output electrode 9.

Figure 2A:
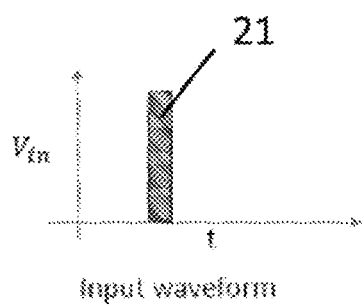
FIG. 2a shows an input waveform applied by the device shown in FIG. 1.
Figure 2B:
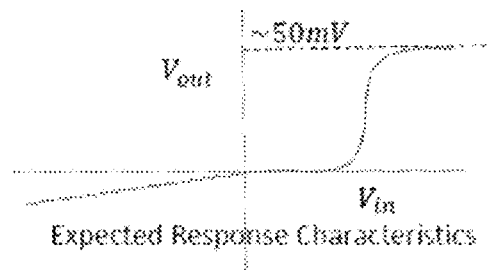
FIG. 2b shows the expected response characteristics of the voltage measured by the device 1 shown in FIG. 1.
Figure 2C:
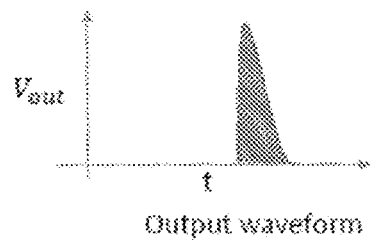
FIG. 2c shows an output waveform received and measured by the voltage output 13 of the device 1 shown in FIG. 1.

Operation of the signal processing device 1 shown in FIG. 1 will now be described, also with reference to FIGS. 2a, 2b and 2c. FIG. 2a shows an input waveform applied as an input voltage signal pulse by the voltage input 12 of the device 1 shown in FIG. 1. FIG. 2b shows the expected response characteristics of the output voltage measured at the voltage output 13 of the device 1 shown in FIG. 1, as a function of the input voltage. FIG. 2c shows an output waveform received and measured by the voltage output 13 of the device 1 shown in FIG. 1.

In operation, the voltage input 12 of the device generates and applies an input voltage signal pulse (e.g. the input waveform 21 shown in FIG. 2a) to the input electrode 8. Via the hydrophobic conductive coating 11 of the input electrode 8, which is in electrical contact with the lipid monolayer 4, the input voltage signal pulse excites the lipid molecules 5 of the lipid monolayer 4 that are in contact with the hydrophobic conductive coating 11 of the input electrode 8.

The amplitude of the input voltage signal pulse excites the lipid molecules 5 of the lipid monolayer 4 such that they undergo a phase transition, i.e. they go stiff owing to the excitement, causing a liquid expanded to a liquid condensed transition in the lipid monolayer 4. This phase transition generates a mechanical pulse in the lipid monolayer 4 which is propagated along the lipid monolayer 4 as a sound wave 14.

The sound wave 14 is propagated along the lipid monolayer 4 such that it is received at the output electrode 9. Here, the reverse of the process undergone at the input electrode 8 takes place. Thus the mechanical pulse in the lipid monolayer 4 is detected by the hydrophobic conductive coating 11 of the output electrode 9 and converted into an output voltage signal pulse. This output voltage signal pulse generated in the output electrode 9 is measured by the voltage output 13.

The expected response characteristics of the device 1 are shown in FIG. 2b. This shows the threshold behaviour of the device 1 in that until an input voltage of sufficient amplitude is applied at the input electrode 8, the excitement threshold of the lipid monolayer 4 to induce a phase transition is not reached and so no response is measured by the voltage output 13. However, once the amplitude of the input voltage applied reaches a sufficient threshold, the input electrode 8 excites the lipid molecules 5 in the lipid monolayer 4 sufficiently to induce a phase transition which generates the mechanical pulse that propagates to the output electrode 9 (as described above) and results in an output voltage signal pulse (having an output waveform as shown in FIG. 2c) being measured by the voltage output 13.

Figure 3A:
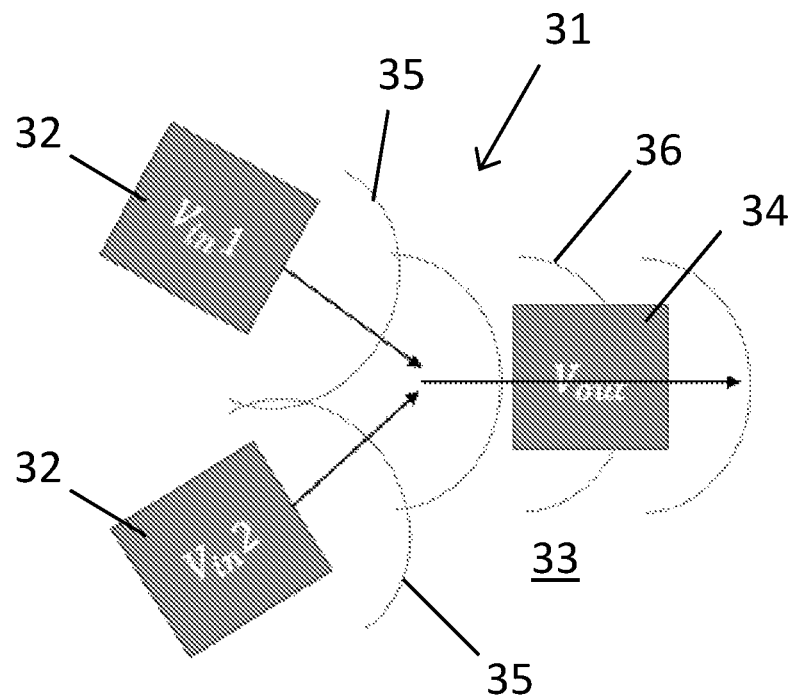
FIGS. 3a and 3b show schematically the layout of signal processing devices in accordance with embodiments of the present invention.
Figure 3B:
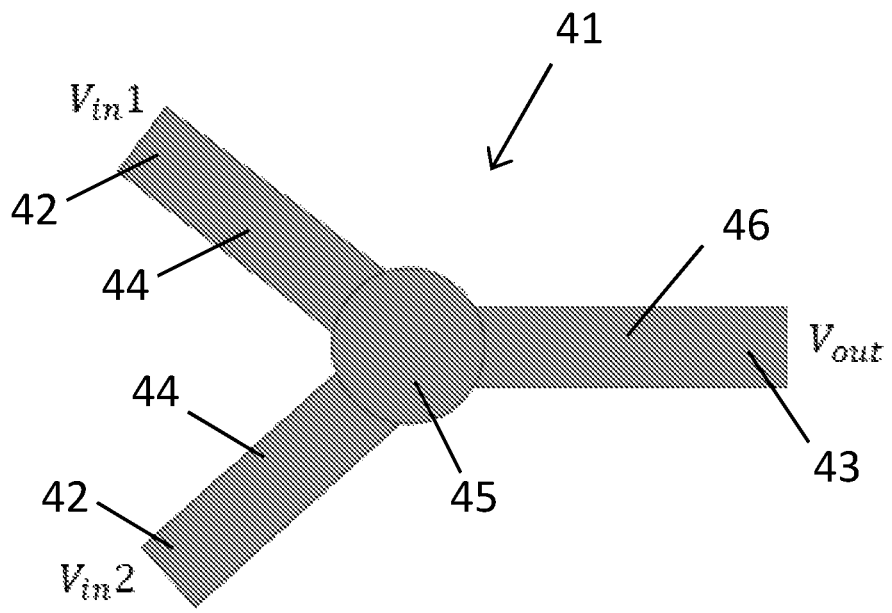

FIGS. 3a and 3b show schematically the layout of signal processing devices in accordance with embodiments of the present invention. The signal processing devices in FIGS. 3a and 3b are shown from above and, for example, include the same arrangement of the lipid interface and the input and output electrodes shown in FIG. 1.

In FIG. 3a, the signal processing device 31 (which is arranged in the same way as the signal processing device 1 shown in FIG. 1) has two input electrodes 32. The input electrodes 32 are each arranged to apply an input voltage signal pulse to the lipid monolayer 33 of the device 31. The device 31 includes a single output electrode 34 arranged to detect the resultant mechanical response from the lipid monolayer 33, which is measured as an output voltage signal pulse (in the same manner as for the device 1 shown in FIG. 1).

As shown in FIG. 3a, the mechanical pulses which are generated in the lipid monolayer 33 propagate as respective sound waves 35. Owing to the relative positions of the input electrodes 32, the propagating sound waves 35 interfere (e.g. constructively or destructively) or interact non-linearly (where the resulting amplitude is not equal to the linear sum of interacting sound waves) where they meet and a resultant sound wave 36 propagates towards the output electrode 34 where it is detected.

FIG. 3b shows a very similar arrangement of a signal processing device 41 to that shown in FIG. 3a, which operates in a similar way. The device 41 shown in FIG. 3b comprises two input electrodes 42 and a single output electrode 43. In addition, the device comprises two channels 44 extending from the input electrodes 42 which extend to a common meeting point 45. A single channel 46 then extends to the output electrode 43.

The signal processing device 41 shown in FIG. 3b operates in a very similar way as the device 31 shown in FIG. 3a. The only difference is that the two channels 44 extending from the input electrodes 42 to the common meeting point 45 and then the single channel 46 to the output electrode 43 act as waveguides which help the sound waves to propagate over the lipid monolayer.

Figure 4:
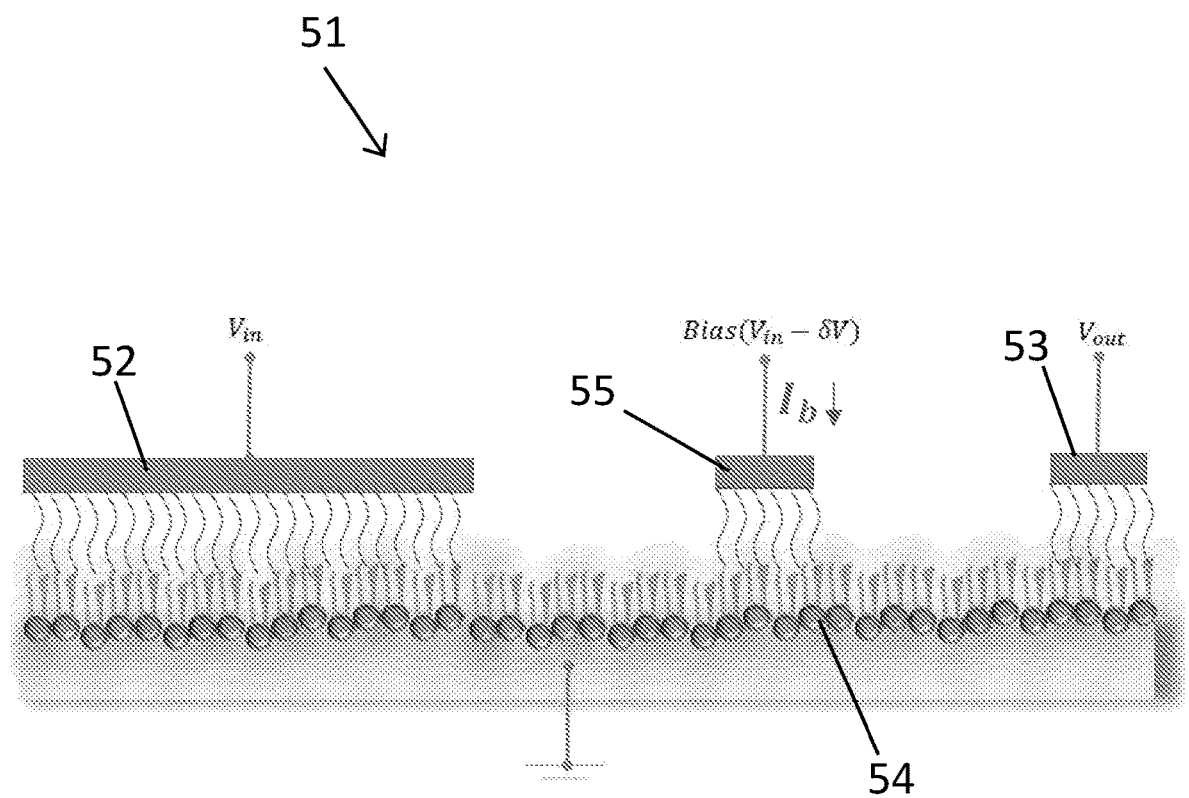
FIG. 4 shows schematically a signal processing device in accordance with an embodiment of the present invention.

FIG. 4 shows schematically another signal processing device 51 according to an embodiment of the present invention. FIG. 4, similar to FIG. 1, shows a cross-sectional side view of a signal processing device 51.

The device 51 shown in FIG. 4 is very similar to the device 1 shown in FIG. 1, in that it comprises an input electrode 52 and an output electrode 53 which are arranged to propagate sound waves therebetween via a lipid monolayer 54. The device 51 shown in FIG. 4 additionally comprises an amplifying relay 55 between the input electrode 52 and the output electrode 53.

The amplifying relay 55 has the same structure as the input and output electrodes 52, 53 and so is in electrical contact with the lipid monolayer 54. A bias voltage is applied to the amplifying relay 55. The bias voltage determines the position of the lipid monolayer's state ("base" voltage) with respect to the threshold voltage. Thus by lowering or increasing the bias voltage the amplifying relay 55 can be positioned to be more or less excitable.

In operation, the input electrode 52 acts as described above to apply an input voltage signal pulse to the lipid monolayer 54 which induces a mechanical pulse in the lipid monolayer 54. The mechanical pulse is propagated as a sound wave via the lipid monolayer 54 and is received by the amplifying relay 55.

The amplifying relay 55 detects the incoming sound wave as a mechanical response (which is converted into a voltage by the amplifying relay). The bias voltage of the amplifying relay 55 then acts to cause the amplifying relay 55 to amplify the mechanical pulse and thus amplify the amplitude of the sound wave propagating via the lipid monolayer 54. The amplified sound wave propagating via the lipid monolayer 54 is then received and detected at the output electrode 53 in the same manner as for the devices described above.

Alternatively, the amplifying relay 55 may detect the incoming sound wave in a more continuous way. This is to use the properties of the bias current $I_b$ through the amplifying relay 55, as shown in FIG. 4. Owing to the bias voltage ($V_b=V_{in}-\delta V$) applied to the amplifying relay 55, a sudden increase in the bias current will be seen at the amplifying relay 55 when the mechanical pulse is incident upon the amplifying relay. This is because the conductivity of the lipid monolayer 54 increases non-linearly during the propagation of a sound wave (similar to dielectric breaking) such that a region of coexisting phases just behind the mechanical pulse has a much higher conductivity than either the fluid or gel phase of the lipid monolayer 54.

This increase in the bias current neutralises the bias voltage suddenly and thus amplifies the mechanical pulse propagating in the lipid monolayer 54. The bias current has two components: the capacitive component is the same as for the input and output electrodes 52, 53 but there is also a resistive component which does work on the lipid monolayer 54, allowing it to amplify the mechanical pulse. This does not need any external control which is synchronised with the incidence of the mechanical pulse on the amplifying relay 55.

It can be seen from the above that, in at least the preferred embodiments, the present invention provides a signal processing device which propagates signals using sound waves via a lipid interface. The substantially adiabatic nature of sound waves is fundamentally more efficient than a conventional electronic device which dissipates large amounts of heat. It will be appreciated that the device of the present invention may therefore allow highly energy efficient computing systems to be constructed.

The present invention may also allow logic processing systems to be implemented in biological systems, owing to the natural presence of lipid interfaces in cell membranes, for example. This may therefore allow the properties of neurons and the propagation of signals in neurons to be investigated. Kaufmann, "Action Potentials and Electrochemical Coupling in the Macroscopic Chiral Phospholipid Membrane", Caruaru, 1989, proposed that thermodynamic properties of action potentials may be explained on the basis of non-linear sound waves in the plasma membrane of a neuron. Heimburg et al, "On soliton propagation in biomembranes and nerves", Proceedings of the National Academy of Sciences of the United States of America, 2005, 102(28), 9790-9795, proposes that under the influence of an action potential, solitons may propagate in nerve membranes.

Furthermore, the device may be operated as a biomolecular or a physical sensor, owing to the sensitivity of the device to phase transitions in the lipid interface, which in turn may be affected by the presence of extraneous molecules entering the lipid interface.

The invention claimed is:

1. A signal processing device comprising:
an input transducer comprising electrodes arranged to apply an input signal to a lipid interface, the lipid interface having a thickness and being arranged between a first medium and a second medium, wherein the lipid interface comprises a plurality of lipid molecules;
wherein the input signal comprises one of:
a) a voltage difference applied across the thickness of the lipid interface; and,
b) a current flow through the thickness of the lipid interface,
wherein, when applied to the lipid interface by the input transducer, the input signal generates a mechanical pulse in the lipid interface; and the signal processing device further comprises
an output transducer arranged to receive an output signal by detecting a mechanical response in the lipid interface from the mechanical pulse generated in the lipid interface by the input transducer; and,
wherein the lipid interface is arranged to propagate the mechanical pulse from the input transducer via the lipid interface to the output transducer.

2. The signal processing device as claimed in claim 1, wherein the first medium comprises a fluid and the second medium comprises a fluid.

3. The signal processing device as claimed in claim 1, wherein the first medium comprises a liquid medium and the second medium comprises a gaseous medium.

4. The signal processing device as claimed in claim 1, wherein the first medium and/or the second medium is viscoelastic.

5. The signal processing device as claimed in claim 1, wherein the lipid interface comprises a monolayer of lipid molecules.

6. The signal processing device as claimed in claim 1, wherein the lipid interface is elastic; and/or
   wherein the lipid interface exhibits non-linear behaviour; and/or
   wherein the lipid interface comprises a non-linear compressible piezo-electric film.

7. The signal processing device as claimed in claim 1, wherein the lipid molecules are arranged to undergo a phase transition when they are excited by the input transducer; and
   wherein the lipid molecules transition from an expanded state to a condensed state when they are excited by the input transducer.

8. The signal processing device as claimed in claim 1, wherein the lipid interface is arranged to exhibit a threshold behaviour when the input pulse is applied to the lipid interface by the input transducer.

9. The signal processing device as claimed in claim 1, wherein the lipid interface is arranged such that the mechanical pulse generated in the lipid interface by the input transducer propagates via the lipid interface as a sound wave.

10. The signal processing device as claimed in claim 1, wherein the lipid molecules comprise lyotropic liquid crystals; and/or
    wherein the lipid molecules comprise chains of carbon atoms; and/or
    wherein the lipid molecules comprise phospholipid molecules.

11. The signal processing device as claimed in claim 1, wherein the input transducer is driven by an electrical input signal.

12. The signal processing device as claimed in claim 1, wherein the input transducer comprises an electrode arranged in electrically conducting contact with the lipid interface.

13. The signal processing device as claimed in claim 12, wherein the electrode comprises a semiconductor electrode; and/or
    wherein the electrode comprises a hydrophobic coating arranged in contact with the lipid interface.

14. The signal processing device as claimed in claim 1, wherein the signal processing device comprises an amplifying transducer arranged between the input transducer and the output transducer, wherein the amplifying transducer is arranged to detect a mechanical response in the lipid interface from the mechanical pulse generated in the lipid interface by the input transducer and to amplify the detected mechanical response to propagate an amplified mechanical pulse via the lipid interface to the output transducer.

15. The signal processing device as claimed in claim 14, wherein a bias voltage is applied to the amplifying transducer so as to amplify the mechanical pulse in the lipid interface.

16. The signal processing device as claimed in claim 15, wherein the bias voltage applied to the amplifying transducer is arranged to generate an output current in the amplifying transducer when the mechanical pulse propagating along the lipid interface is incident upon the amplifying transducer.

17. The signal processing device as claimed in claim 1, wherein the signal processing device comprises one or more channels arranged to direct the mechanical pulse generated by the input transducer to the output transducer.

18. The signal processing device as claimed in claim 1, wherein the signal processing device comprises a plurality of input transducers each arranged to apply an input signal to the lipid interface, wherein each input signal is arranged to generate a mechanical pulse in the lipid interface, and wherein the output transducer is arranged to receive the resultant interaction of the plurality of mechanical pulses generated by the plurality of input transducers respectively as the output signal.

19. The signal processing device as claimed in claim 1, wherein the input transducer comprises a first electrode arranged in contact with the lipid monolayer and a second electrode disposed in the second medium.

* * * * *